(12) United States Patent
Guo

(10) Patent No.: US 10,175,799 B2
(45) Date of Patent: Jan. 8, 2019

(54) SUBSTRATE, METHOD FOR MANUFACTURING THE SAME, TOUCH SCREEN AND DISPLAY DEVICE

(71) Applicants: BOE Technology Group Co., Ltd., Beijing (CN); Chongqing BOE Optoelectronics Technology Co., Ltd., Chongqing (CN)

(72) Inventor: Jiandong Guo, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/502,920

(22) PCT Filed: Jul. 27, 2016

(86) PCT No.: PCT/CN2016/091827
§ 371 (c)(1),
(2) Date: Feb. 9, 2017

(87) PCT Pub. No.: WO2017/117980
PCT Pub. Date: Jul. 13, 2017

(65) Prior Publication Data
US 2018/0107310 A1 Apr. 19, 2018

(30) Foreign Application Priority Data
Jan. 4, 2016 (CN) .......................... 2016 1 0006415

(51) Int. Cl.
*G06F 3/041* (2006.01)
*G02B 1/115* (2015.01)

(52) U.S. Cl.
CPC ............ *G06F 3/0412* (2013.01); *G02B 1/115* (2013.01); *G06F 3/041* (2013.01); *G02F 2201/38* (2013.01); *G06F 2203/04103* (2013.01)

(58) Field of Classification Search
CPC ......... G06F 3/0412; G06F 2203/04103; G06F 3/041; G02B 1/111; G02B 1/113; G02B 1/115; G02F 2201/38
See application file for complete search history.

(56) References Cited

U.S. PATENT DOCUMENTS 4,370,027 A 1/1983 Sato et al.
9,180,486 B2 * 11/2015 Sun .................. G02B 1/111
(Continued)

FOREIGN PATENT DOCUMENTS

| CN | 101970047 A | 2/2011 |
|----|-------------|--------|
| CN | 103450495 A | 12/2013 |

(Continued)

OTHER PUBLICATIONS

International Search Report and Written Opinion of International Application No. PCT/CN2016/091827, dated Oct. 10, 2016, 13 pages.

(Continued)

*Primary Examiner* — Tom Sheng
(74) *Attorney, Agent, or Firm* — Westman, Champlin & Koehler, P.A.

(57) ABSTRACT

The present disclosure discloses a substrate, a method for manufacturing a substrate, a touch screen and a display device. The substrate includes a base substrate and an anti-reflection film provided on the base substrate. The anti-reflection film includes a first dense homogeneous layer, (Continued)

a nano-porous layer and a second dense homogeneous layer. All the layers of the anti-reflection film include $SiO_2$ material.

14 Claims, 2 Drawing Sheets

(56) References Cited

U.S. PATENT DOCUMENTS

| | | | |
|---|---|---|---|
| 9,291,747 B2* | 3/2016 | Fournand | G02B 1/115 |
| 9,778,801 B2* | 10/2017 | Jung | G06F 3/044 |
| 2010/0262211 A1 | 10/2010 | Glaubitt et al. | |
| 2010/0313950 A1* | 12/2010 | Mukhopadhyay | C03C 17/30 |
| | | | 136/256 |
| 2011/0111203 A1* | 5/2011 | Roemer-Scheuermann | |
| | | | C03C 17/3411 |
| | | | 428/312.6 |
| 2012/0308725 A1* | 12/2012 | Varaprasad | G02B 1/111 |
| | | | 427/164 |

FOREIGN PATENT DOCUMENTS

| | | |
|---|---|---|
| CN | 103488346 A | 1/2014 |
| CN | 204882911 U | 12/2015 |
| CN | 105607158 A | 5/2016 |
| JP | 2002-90734 A | 3/2002 |
| JP | 2010-38948 A | 2/2010 |
| JP | 2013-217977 A | 10/2013 |
| JP | 5614214 B2 | 9/2014 |
| JP | 2015-206908 A | 11/2015 |

OTHER PUBLICATIONS

English translation of Box No. V of the Written Opinion for the International Searching Authority for International Application No. PCT/CN2016/091827, 2 pages.

First Office Action, including Search Report, for Chinese Patent Application No. 201610006415.9, dated Dec. 2, 2016, 15 pages.

Second Office Action for Chinese Patent Application No. 201610006415.9, dated Jun. 5, 2017, 15 pages.

Third Office Action from Chinese Patent Application No. 201610006415.9, dated Nov. 1, 2017, 13 pages.

* cited by examiner

SUBSTRATE, METHOD FOR MANUFACTURING THE SAME, TOUCH SCREEN AND DISPLAY DEVICE

CROSS-REFERENCE TO RELATED APPLICATION

This application is a Section 371 National Stage Application of International Application No. PCT/CN2016/091827, filed on Jul. 27, 2016, entitled "SUBSTRATE, METHOD FOR MANUFACTURING A SUBSTRATE, TOUCH SCREEN AND DISPLAY DEVICE", which has not yet published, which claims priority to Chinese Application No. 201610006415.9, filed on Jan. 4, 2016, incorporated herein by reference in their entirety.

BACKGROUND OF THE DISCLOSURE

Field of the Disclosure

The present disclosure relates to a field of display technology, in particular, to a substrate, a method for manufacturing a substrate, a touch screen and a display device.

Description of the Related Art

In order to improve an image quality of intelligent display products such as cellphone, tablet computer or the like, typically, a functional film is adhered onto a surface of a cover glass or the cover glass is coated with a functional coating. If ambient light is intense, ambient objects are typically reflected onto the display screen, thereby affecting a display image quality adversely and thus reducing a display quality. Thus, it is necessary to perform an anti-reflection process. In addition, with regard to a touch screen, for example, on-cell type touch screen, the ITO pattern is easily observed by a user under a bright environment, thereby reducing the visibility, thus it is necessary to coat the cover glass with a shadow elimination layer.

Generally, an anti-reflection effect on the glass surface within a visible light range may be obtained by two methods. In one method, an incident light and a reflected light may be eliminated by utilizing an interference effect generated between films of different optical materials so as to increase transmittance. In the other method, a large amount of incident light is converted into diffuse reflection light by utilizing a diffusion of a coarse surface, which will not substantially change the transmittance. In the former method, the base material is typically PET, however, it is not convenient for such material to obtain a thin and light product. Further, one high temperature process is required when the PET base material is hardened, and a diffusion is easy to be generated due to a nonuniform surface molecular structure of the base material during the high temperature process, thereby leading to a rainbow pattern. Moreover, in the latter method, a haze on the glass surface is typically increased, thereby affecting a resolution of display image adversely.

SUMMARY

In order to solve at least one aspect of the above problems, embodiments of the present disclosure provide a substrate, a method for manufacturing a substrate, a touch screen and a display device.

The present disclosure provides a substrate comprising a base substrate and an anti-reflection film provided on the base substrate, wherein, the anti-reflection film comprises a nano-porous layer.

Optionally, a material of the nano-porous layer comprises $SiO_2$.

Optionally, the anti-reflection film further comprises a first dense homogeneous layer provided between the nano-porous layer and the base substrate and contacting with a surface of the nano-porous layer. Optionally, a material of the first dense homogeneous layer comprises $SiO_2$.

Optionally, the anti-reflection film further comprises a second dense homogeneous layer provided at a side of the nano-porous layer away from the base substrate and contacting with another surface of the nano-porous layer. Optionally, a material of the second dense homogeneous layer comprises $SiO_2$.

Optionally, the base substrate is a glass substrate, and a total refractive index of the nano-porous layer together with the two dense homogeneous layers on upper and lower surfaces of the nano-porous layer is $n_2$, an air refractive index is $n_1$ which is equal to 1, and a refractive index of the glass substrate is $n_3$, and the refractive indexes satisfy the following condition:

$$n_2^2 = n_1 n_3.$$

Optionally, the refractive index $n_3$ of the glass substrate ranges from 1.458 to 1.534.

Optionally, the refractive index of the nano-porous layer satisfies the following condition:

$$n_{22}^2 = (n^2-1)(1-p)+1,$$

wherein, $n_{22}$ is the refractive index of the nano-porous layer, $n_{21}$ is the refractive index of the first dense homogeneous layer, and $n_{23}$ is the refractive index of the second dense homogeneous layer, and $n_{21} = n_{23} = n$, and p is a volume fraction of voids accounting for a film material of the nano-porous layer.

Optionally, a material of the nano-porous layer comprises $SiO_2$, a porosity of the nano-porous layer reaches up to 50%, and the refractive index of the nano-porous layer is equal to 1.21.

A thickness of the nano-porous layer is $d_2$, a thickness of the first dense homogeneous layer is $d_1$ and a thickness of the second dense homogeneous layer is $d_3$, a relation of $d_1$, $d_2$ and $d_3$ is designed in such a way that light wave reflected from an upper surface of the first dense homogeneous layer is opposite in phase to light wave reflected from a lower surface of the second dense homogeneous layer.

Optionally, one nano-porous layer together with one second dense homogeneous layer may be used as one anti-reflection unit, and at least one anti-reflection unit is provided in order on a surface at a side of the second dense homogeneous layer away from the base substrate.

The present disclosure may further provide a method for manufacturing a substrate, comprising: forming an anti-reflection film on a base substrate through sol-gel process, the anti-reflection film comprising a nano-porous layer.

Optionally, the method may further comprise: forming a first dense homogeneous layer on the base substrate through chemical vapor deposition before forming the anti-reflection film through sol-gel process.

Optionally, the method may further comprise: forming a second dense homogeneous layer on a surface of the formed nano-porous layer away from the base substrate through chemical vapor deposition.

Optionally, the method may further comprise: forming at least one anti-reflection unit in order on a surface at a side of the formed second dense homogeneous layer away from the base substrate, the anti-reflection unit comprising one nano-porous layer and one second dense homogeneous layer.

The present disclosure may further provide a touch screen, comprising: a touch substrate on which a touch electrode is formed; and the substrate according to any one of the above embodiments, which is arranged to be opposite to the touch substrate.

The present disclosure may further provide a display device comprising the substrate according to any one of the above embodiments.

LIST OF REFERENCE NUMERALS

1—base substrate;
2—anti-reflection film;
21—first dense homogeneous layer;
22—nano-porous layer;
23—second dense homogeneous layer.

DETAILED DESCRIPTION OF PREFERRED EMBODIMENTS OF THE DISCLOSURE

In order to make those skilled in the art have a better understanding of the technical solutions of the present disclosure, the present disclosure will be described in further detail below with reference to the accompanying drawings and specific embodiments.

Unless otherwise defined, technical terms or scientific terms used herein should refer to the ordinary meaning as understood by those skilled in the art to which this disclosure belongs. The terms "first," "second," and the like as used in the specification and claims of the present disclosure do not denote any order, amount or importance, but are merely used to distinguish different constituent parts. Likewise, the terms "a" or "an" and the like do not denote a numerical limitation, but rather denote at least one concerned item. The terms "connecting" or "connected" and the like are not limited to physical or mechanical connections, but may include electrical connections, either direct or indirect. The terms "up", "down", "left", "right" and the like are used only to indicate the relative positional relationship, and the relative positional relationship may be changed accordingly when the absolute position of the object is changed.

The present disclosure discloses a substrate, a method for manufacturing a substrate, a touch screen and a display device. In the substrate, by means of providing an anti-reflection film comprising a nano-porous layer on a base substrate, light transmittance may be effectively increased and light reflectivity may be reduced, so as to achieve shadow elimination and thus improve display effect.

Figure 1:
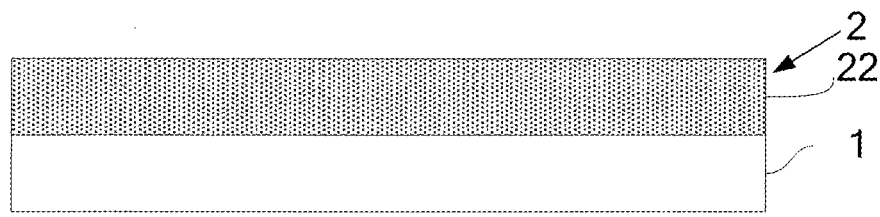
FIG. 1 is a schematic view of a substrate according to an embodiment of the present disclosure.

An embodiment of the present disclosure provides a substrate, as shown in FIG. 1, comprising: a base substrate 1; and an anti-reflection film 2 disposed on the base substrate 1. The anti-reflection film 2 comprises a nano-porous layer 22.

Optionally, a material of the nano-porous layer 22 may include $SiO_2$.

Figure 2:
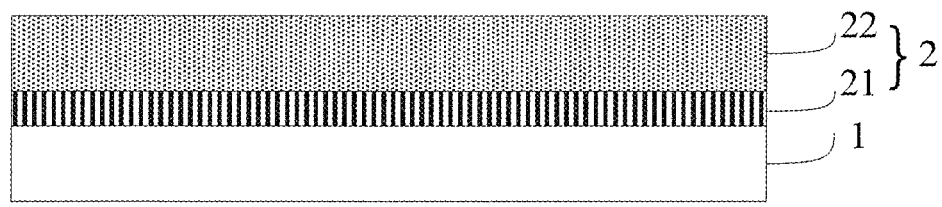
FIG. 2 is a schematic view of a substrate according to another embodiment of the present disclosure.

Optionally, as shown in FIG. 2, the anti-reflection film 2 may comprise a first dense homogeneous layer 21 disposed between the nano-porous layer 22 and the base substrate 1 and contacting with a surface of the nano-porous layer 22. A material of the first dense homogeneous layer 21 may include $SiO_2$. Since both the nano-porous layer 22 and the first dense homogeneous layer 21 are based on a network structure formed of silicon-oxygen bonds and the newly formed film surface has a large number of broken bonds, the activity is high, which contributes to enhancing the deposition efficiency and the bonding force of the nano-porous layer 22, so that the nano-porous layer 22 is prevented from falling off during a high-temperature drying treatment.

Figure 3:
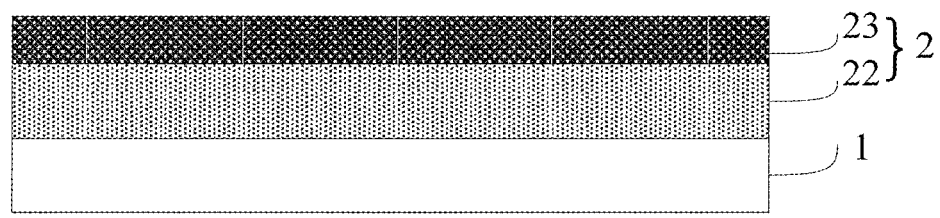
FIG. 3 is a schematic view of a substrate according to a further embodiment of the present disclosure.

Optionally, as shown in FIG. 3, the anti-reflection film 2 comprises a second dense homogeneous layer 23 disposed on a side of the nano-porous layer 22 away from the base substrate 1 and contacting with a surface of the nano-porous layer 22. A material of the second dense homogeneous layer 23 may include $SiO_2$. The second dense homogeneous layer 23 may effectively prevent moisture and dust from being adsorbed on the surface of the nano-porous layer 22 of the $SiO_2$ film so as to prevent an increase in haze on glass and function as a protective layer.

Figure 4:
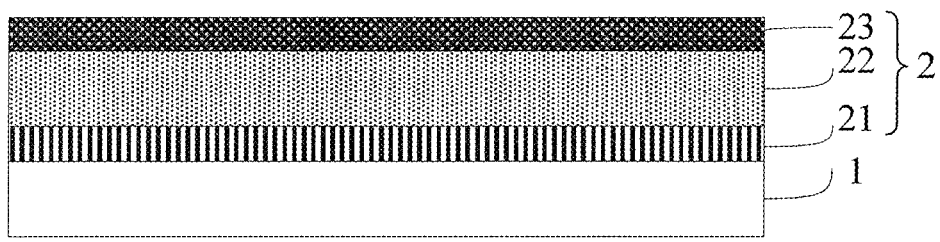
FIG. 4 is a schematic view of a substrate according to another further embodiment of the present disclosure.

Optionally, as shown in FIG. 4, the anti-reflection film 2 may comprise a first dense homogeneous layer 21 disposed between the nano-porous layer 22 and the base substrate 1 and contacting with a surface of the nano-porous layer 22, and may further comprise a second dense homogeneous layer 23 disposed on a side of the nano-porous layer 22 away from the base substrate 1 and contacting with another surface of the nano-porous layer 22. The base substrate 1 is a glass substrate. A total refractive index of the nano-porous layer 22 together with the two dense homogeneous layers on upper and lower surfaces of the nano-porous layer 22 is $n_2$, an air refractive index is $n_1$ which is equal to 1, and a refractive index of the glass substrate is $n_3$. The refractive indexes may satisfy the following condition:

$$n_2^2 = n_1 n_3 \tag{1}$$

Specifically, the refractive index of the glass substrate $n_3$ ranges from 1.458 to 1.534. The refractive index of the $SiO_2$ film material of the nano-porous layer 22 optionally ranges from 1.21 to 1.24. The larger a porosity of the nano-porous layer 22 is, the smaller the refractive index thereof is.

The refractive index of the nano-porous layer 22 is $n_{22}$, the refractive index of the first dense homogeneous layer 21 is $n_{21}$, and the refractive index of the second dense homogeneous layer 23 is $n_{23}$. In an example, $n_{21}=n_{23}=n$. A volume fraction of voids accounting for the film material of the nano-porous layer 22 is p. The refractive index $n_{22}$ of the nano-porous layer may satisfy the following condition (i.e. formula):

$$n_{22}^2 = (n^2-1)(1-p)+1 \tag{2}$$

Optionally, if the material of the nano-porous layer 22 is $SiO_2$ and the porosity of the nano-porous layer 22 reaches up to 50%, the refractive index of the nano-porous layer 22 is equal to 1.21. The porosity of the nano-porous $SiO_2$ may reach up to about 50% or even more than 50%, so that light is focused and transmitted through several reflections, thereby achieving a purpose of anti-reflection.

Provided that both the first dense homogeneous layer 21 and the second dense homogeneous layer 23 are formed of dense $SiO_2$ and have the same refractive index, that is, $n_{21}=n_{23}=1.3885$, the refractive index $n_{22}$ of the nano-porous layer 22 is equal to 1.21 according to the formula (2) if the porosity of the nano-porous layer 22 is valued as 50%. In this case, if a thickness $d_1$ of the first dense homogeneous layer 21, a thickness $d_2$ of the nano-porous layer 22 and a thickness $d_3$ of the second dense homogeneous layer 23 are equal to 23 nm, 55 nm and 23 nm, respectively, as an example, with regard to light having a wavelength of 550 nm, the reflectivity of a pure glass is 4.5% while the total reflectivity of the three layers is reduced to 0.44%. In other words, the light reflectivity is greatly reduced.

Provided that a thickness of the nano-porous layer 22, a thickness of the first dense homogeneous layer 21 and a thickness of the second dense homogeneous layer 23 are labeled as $d_2$, $d_1$ and $d_3$, respectively, values of $d_1$, $d_2$ and $d_3$ may be matched with each other in such a way that light wave reflected from an upper surface of the first dense homogeneous layer 21 is opposite in phase to light wave reflected from a lower surface of the second dense homogeneous layer 23, thereby achieving shadow elimination to a certain extent. Further, the anti-reflection film reduces light reflectivity and increases light transmittance, so that it reduces difference in reflection when light passes through the surfaces of the substrate, so as to achieve shadow elimination further.

Figure 5:
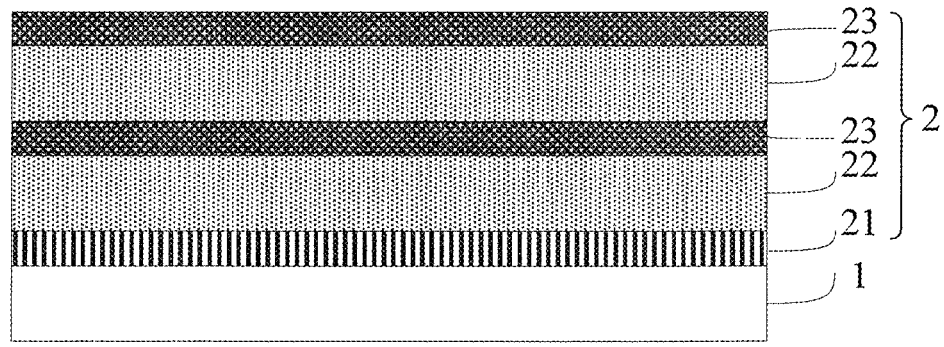
FIG. 5 is a schematic view of a substrate according to still another further embodiment of the present disclosure.

Optionally, as shown in FIG. 5, one nano-porous layer 22 together with one second dense homogeneous layer 23 may be used as one anti-reflection unit. At least one anti-reflection unit may be provided in order on a surface at a side of the second dense homogeneous layer 23 away from the base substrate 1. The anti-reflection effect is proportional to the number of the anti-reflection units. In other words, the larger the number of the anti-reflection units is, the better the shadow elimination effect is.

Figure 6:
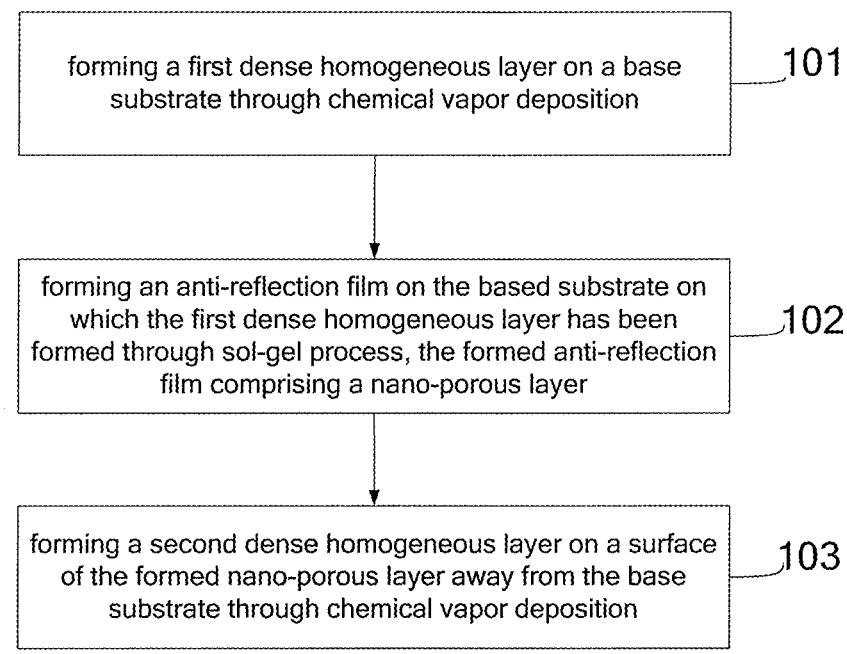
FIG. 6 is a schematic flow chart of a method for manufacturing a substrate according to an embodiment of the present disclosure.

The present disclosure may further provide a method for manufacturing a substrate. FIG. 6 is a flow chart of the method for manufacturing a substrate. As shown in FIG. 6, the method may comprise steps of:

S101. forming a first dense homogeneous layer on a base substrate through chemical vapor deposition;

S102. forming an anti-reflection film on the based substrate on which the first dense homogeneous layer has been formed through sol-gel process, the formed anti-reflection film being a nano-porous layer; and S103. forming a second dense homogeneous layer on a surface of the formed nano-porous layer away from the base substrate through chemical vapor deposition.

In addition, one nano-porous layer together with one second dense homogeneous layer may be used as one anti-reflection unit. At least one anti-reflection unit may be provided in order on a surface at a side of the second dense homogeneous layer away from the base substrate.

Moreover, the present disclosure may provide a touch screen comprising: a touch substrate on which a touch electrode is disposed; and a substrate according to any one of the above embodiments, arranged to be opposite to the touch substrate.

Further, the present disclosure may provide a display device comprising the substrate according to any one of the above embodiments.

In the embodiments of the present disclosure, the nano-porous layer is prepared by using the sol-gel process. When light passes through the nano-porous layer, it is focused and transmitted through several reflections, thereby achieving a purpose of anti-reflection. Specifically, in the sol-gel process, the nano-porous $SiO_2$ is prepared by using a mixed solution of ethyl orthosilicate and absolute ethanol as a precursor and ammonia as a catalyst. The process may comprise steps of: (1) preparing sol; (2) forming gel; (3) aging; (4) drying; and (5) heat treatment.

An overall reaction may be expressed by the following reaction formula:

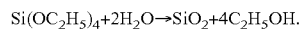

$$Si(OC_2H_5)_4 + 2H_2O \rightarrow SiO_2 + 4C_2H_5OH.$$

In the embodiment, the first dense homogeneous layer with high surface activity is formed through chemical vapor deposition before the nano-porous layer is formed, so as to enhance the deposition efficiency and bonding force of the nano-porous layer, thereby preventing the nano-porous layer from being peeled off during a high-temperature drying treatment. Also, in the embodiment, another dense homogeneous layer is further deposited above the nano-porous layer in order to prevent an increase of the haze of the cover glass caused by water and dust adsorbed onto the surface of the nano-porous layer. Further, as the multiple layers have respective refractive indexes, the respective thicknesses of the multiple layers may be adjusted to achieve an optical matching, thereby achieving a shadow elimination effect. In the chemical vapor deposition in the embodiment, the dense homogeneous $SiO_2$ is deposited onto the surface of the glass substrate by using $SiH_4$ and $O_2$ as reaction gas. An overall reaction may be expressed by the following reaction formula:

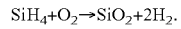

$$SiH_4 + O_2 \rightarrow SiO_2 + 2H_2.$$

The method for manufacturing the substrate according to the embodiments of the present disclosure is simple and easy to be implemented. Also, the method may increase the light transmittance effectively and reduce the light reflectivity, so as to achieve shadow elimination and thus improve display effect.

Obviously, those skilled in the art can make various changes and modifications to the present disclosure without departing from the spirit and scope of the present disclosure. Therefore, the present disclosure is intended to include these changes and modifications if they fall into the scope of appended claims and equivalents thereof.

What is claimed is:

1. A substrate comprising:
    a base substrate; and
    an anti-reflection film provided on the base substrate, wherein,
    the anti-reflection film comprises:
    a nano-porous layer,
    a first dense homogeneous layer provided between the nano-porous layer and the base substrate and contacting with a surface of the nano-porous layer, and
    a second dense homogeneous layer provided at a side of the nano-porous layer away from the base substrate and contacting with another surface of the nano-porous layer.

2. The substrate according to claim 1, wherein, a material of the nano-porous layer comprises $SiO_2$.

3. The substrate according to claim 1, wherein, a material of the first dense homogeneous layer comprises $SiO_2$.

4. The substrate according to claim 1, wherein, a material of the second dense homogeneous layer comprises $SiO_2$.

5. The substrate according to claim 1, wherein, the base substrate is a glass substrate, and wherein,
a total refractive index of the nano-porous layer together with the two dense homogeneous layers on upper and lower surfaces of the nano-porous layer is $n_2$, an air refractive index is $n_1$ which is equal to 1, and a refractive index of the glass substrate is $n_3$, and the refractive indexes satisfy the following condition:

$n_2{}^2 = n_1 n_3$.

6. The substrate according to claim 5, wherein,
the refractive index $n_3$ of the glass substrate ranges from 1.458 to 1.534.

7. The substrate according to claim 5, wherein,
the refractive index of the nano-porous layer satisfies the following condition:

$n_{22}{}^2 = (n^2 - 1)(1 - p) + 1$, wherein, $n_{22}$ is the refractive index of the nano-porous layer, $n_{21}$ is the refractive index of the first dense homogeneous layer, and $n_{23}$ is the refractive index of the second dense homogeneous layer, and $n_{21} = n_{23} = n$, and p is a volume fraction of voids accounting for a film material of the nano-porous layer.

8. The substrate according to claim 7, wherein,
a material of the nano-porous layer comprises $SiO_2$, a porosity of the nano-porous layer is equal to 50%, and the refractive index of the nano-porous layer is equal to 1.21.

9. The substrate according to claim 5, wherein,
a thickness of the nano-porous layer is $d_2$, a thickness of the first dense homogeneous layer is $d_1$ and a thickness of the second dense homogeneous layer is $d_3$, a relation of $d_1$, $d_2$ and $d_3$ is designed in such a way that light wave reflected from an upper surface of the first dense homogeneous layer is opposite in phase to light wave reflected from a lower surface of the second dense homogeneous layer.

10. The substrate according to claim 1, wherein,
one nano-porous layer together with one second dense homogeneous layer is used as one anti-reflection unit, and at least one anti-reflection unit is provided in order on a surface at a side of the second dense homogeneous layer away from the base substrate.

11. A touch screen, comprising:
a touch substrate on which a touch electrode is formed; and
the substrate according to claim 1, which is arranged to be opposite to the touch substrate.

12. A display device comprising the substrate according to claim 1.

13. A method for manufacturing a substrate, comprising:
forming a first dense homogeneous layer on a base substrate through chemical vapor deposition;
forming a nano-porous layer on the first dense homogeneous layer through sol-gel process, and
forming a second dense homogeneous layer on a surface of the formed nano-porous layer away from the base substrate through chemical vapor deposition.

14. The method according to claim 13, further comprising:
forming at least one anti-reflection unit in order on a surface at a side of the formed second dense homogeneous layer away from the base substrate, the anti-reflection unit comprising one nano-porous layer and one second dense homogeneous layer.

* * * * *